United States Patent [19]

Arkens et al.

[11] Patent Number: 5,718,728
[45] Date of Patent: *Feb. 17, 1998

[54] METHOD FOR STRENGTHENING CELLULOSIC SUBSTRATES, CELLUOSIC NON WOVEN WIPES, AND PAPER FILTER STOCK

[75] Inventors: Charles Thomas Arkens, Hatfield; Scott Lind Egolf, Lansdale; Robert David Gleim, New Hope; Oscar Hsien-Hsiang Hsu, Lansdale; Kenneth John Wiesinger, Ambler, all of Pa.

[73] Assignee: Rohm and Haas Company, Phila, Pa.

[*] Notice: The term of this patent shall not extend beyond the expiration date of Pat. No. 5,427,587.

[21] Appl. No.: 703,275

[22] Filed: Aug. 26, 1996

Related U.S. Application Data

[62] Division of Ser. No. 142,554, Oct. 22, 1993, Pat. No. 5,427,587.

[51] Int. Cl.⁶ ............................... D06M 13/192
[52] U.S. Cl. .................. 8/116.1; 8/194; 8/196; 8/119; 8/120; 8/127.1; 162/164.1; 162/164.2; 162/168.1
[58] Field of Search ................ 8/116.1, 194, 196, 8/119, 120, 127.1; 162/164.1, 164.2, 168.1; 252/8.61, 8.86, 8.62

[56] References Cited

U.S. PATENT DOCUMENTS

| | | | |
|---|---|---|---|
| 4,076,917 | 2/1978 | Swift et al. | 526/49 |
| 4,251,402 | 2/1981 | Login et al. | |
| 4,658,003 | 4/1987 | Schmidt et al. | 526/278 |
| 4,693,847 | 9/1987 | Johnson, Jr. | |
| 4,795,533 | 1/1989 | Young et al. | |
| 4,857,586 | 8/1989 | Bachem et al. | 524/845 |
| 4,936,865 | 6/1990 | Welch et al. | 8/120 |
| 5,042,986 | 8/1991 | Kitchens et al. | 8/120 |
| 5,077,361 | 12/1991 | Hughes et al. | 526/233 |
| 5,137,537 | 8/1992 | Herron et al. | 8/120 |
| 5,143,582 | 9/1992 | Arkens et al. | |
| 5,199,953 | 4/1993 | Fung et al. | 8/120 |
| 5,221,285 | 6/1993 | Andrews et al. | 8/127 |
| 5,273,549 | 12/1993 | Didier et al. | 8/127.1 |
| 5,427,587 | 6/1995 | Arkens et al. | 8/116.1 |

FOREIGN PATENT DOCUMENTS

| | | |
|---|---|---|
| 0 484 196 A1 | 5/1992 | European Pat. Off. |
| 493757 | 7/1992 | European Pat. Off. |
| 0 493 757 A2 | 8/1992 | European Pat. Off. |
| 03 9905 A | 1/1991 | Japan |

OTHER PUBLICATIONS

Textile Research Journal, C.Q. Yang, "Effect of pH on Nonformaldehyde Durable Press Finishing of Cotton Fabric: FT–IR Spectroscopy Study [1]", Jul, 1993, pp. 420–430.

*Primary Examiner*—Alan Diamond
*Attorney, Agent, or Firm*—Ronald D. Bakule

[57] ABSTRACT

This invention relates to a method for strengthening a cellulosic substrate by treating the substrate with a formaldehyde-free curable aqueous composition and curing the composition. The cellulosic substrates include, for example, paper oil- and air-filter stock, rayon nonwoven wipes, cellulosic laminating stock, cotton woven fabrics, and wood flakes suitable to be consolidated into flakeboard.

8 Claims, No Drawings

METHOD FOR STRENGTHENING CELLULOSIC SUBSTRATES, CELLUOSIC NON WOVEN WIPES, AND PAPER FILTER STOCK

This is a divisional of application Ser. No. 08/142,554, filed 22 Oct. 1993 now U.S. Pat. No. 5,427,587.

FIELD OF THE INVENTION

This invention relates to a method for strengthening a cellulosic substrate by treating the substrate with a formaldehyde-free curable aqueous composition and curing the composition. The curable composition contains (a) a polyacid containing at least two carboxylic acid groups, anhydride groups, or the salts thereof; (b) optionally, an active hydrogen compound containing at least two active hydrogen groups selected from the group consisting of hydroxyl, primary amino, secondary amino, and mixtures thereof; and (c) a phosphorous-containing accelerator, wherein the ratio of the number of equivalents of said carboxylic acid groups, anhydride groups, or salts thereof to the number of equivalents of said active hydrogen groups is from about $1/0.01$ to about $1/3$, and wherein the carboxyl groups, anhydride groups, or salts thereof are neutralized to an extent of less than about 35% with a fixed base. The composition is applied to a substrate composed predominantly of cellulosic components. Such substrates include, for example, paper oil- and air-filter stock, rayon nonwoven wipes, polyester/cotton woven fabrics, cellulosic laminating stock, nonwoven cellulosic felts, and wood fibers and flakes consolidated into or suitable to be consolidated into fiberboard, hardboard, particleboard, and oriented strand board.

BACKGROUND OF THE INVENTION

Substrates composed predominantly of cellulosic materials are frequently advantageously strengthened by treatment with a polymeric composition. The treatment with a polymeric composition may also provide reduced sensitivity to moisture vapor or water or solvents in addition to reinforcement of the substrate. Furthermore, the polymeric composition should not substantially detract from essential substrate characteristics, as might be the case, for example, if the cured composition were too rigid or brittle or became sticky under processing conditions. Additionally, the polymeric composition should wet out and penetrate preformed cellulosic webs and mats.

There is a need for a method for strengthening cellulosic substrates by treating with a curable aqueous composition which is free from formaldehyde, because of existing and proposed legislation directed to the lowering or elimination of formaldehyde.

DESCRIPTION OF THE PRIOR ART

U.S. Pat. No. 5,042,986 discloses an aqueous treating solution for cellulosic textiles, the treating solution containing a cyclic aliphatic hydrocarbon of 4 to 6 carbon atoms having 4 or more carboxyl groups wherein at least two adjacent carboxyl groups are in the trans configuration relative to each other. The treating solution includes a suitable curing agent which is the alkali metal dihydrogen phosphate or the alkali metal salt of phosphorous, hypophosphorous, and polyphosphoric acid. The treating process is disclosed to be advantageously used with textiles containing 30–100% cellulosic materials.

U.S. Pat. Nos. 4,820,307; 4,936,865; and 4,975,209 disclose catalysts for the rapid formaldehyde-free esterification and crosslinking of fibrous cellulose in textile form by polycarboxylic acids including saturated, unsaturated, and aromatic acids as well as alpha-hydroxyacids. The catalysts disclosed are acidic or weakly basic salts selected from the alkali metal dihydrogen phosphates and alkali metal salts of phosphorous, hypophosphorous, and polyphosphoric acids.

U.S. Pat. No. 4,795,533 discloses a solid electrolyte membrane which contains a three component blend prepared by admixing an organic polymer, such as polyvinyl alcohol, with an inorganic compound and a polyorganic acid, such as polyacrylic acid. The inorganic compound is disclosed to be selected from a group consisting of phosphoric acid, sulphuric acid, heteropoly acids, or salts of heteropoly acids. Examples of phosphoric acids which may be employed include hypophosphorous acid, metaphosphoric acid, orthophosphoric acid, pyrophosphoric acid, and polyphosphoric acid.

U.S. Pat. No. 4,076,917 discloses β-hydroxyalkylamides and certain polymers thereof as curing agents for polymers containing one or more carboxy or anhydride functions. The β-hydroxyamides are disclosed to be effective in solution, aqueous emulsion, and powder coating form.

None of the references disclose treating a cellulosic substrate with the formaldehyde-free curable aqueous composition of this invention. The composition contains (a) a polyacid containing at least two carboxylic acid groups, anhydride groups, or the salts thereof; (b) optionally, an active hydrogen compound containing at least two active hydrogen groups selected from the group consisting of hydroxyl, primary amino, secondary amino, and mixtures thereof; and (c) a phosphorous-containing accelerator, wherein the ratio of the number of equivalents of said carboxylic acid groups, anhydride groups, or salts thereof to the number of equivalents of said active hydrogen groups is from about $1/0.01$ to about $1/3$, and wherein the carboxyl groups, anhydride groups, or salts thereof are neutralized to an extent of less than about 35% with a fixed base.

STATEMENTS OF THE INVENTION

According to a first aspect of this invention there is provided a method for strengthening a cellulosic substrate by treating the substrate with a formaldehyde-free curable aqueous composition and curing the composition.

According to a second aspect of this invention there is provided a method for increasing the solvent- and water-wet strength and dry strength of a cellulosic nonwoven wipe by treating the substrate with a formaldehyde-free curable aqueous composition and curing the composition.

According to a third aspect of this invention there is provided a method for increasing the solvent- and water-wet strength and dry strength of paper oil- and air-filter stock by treating the substrate with a formaldehyde-free curable aqueous composition and curing the composition.

According to a fourth aspect of this invention there is provided a method for increasing the delamination resistance of cellulosic foils or laminates by treating the cellulosic laminating stock with a formaldehyde-free curable aqueous composition and curing the composition. And a method for forming multi-ply laminates which are bonded together and are capable of forming moldable, B-stageable laminates. According to a fifth aspect of this invention there is provided a method for improving the permanent-press performance of cellulosic woven fabrics by treating the substrate with a formaldehyde-free curable aqueous composition and curing the composition.

According to a sixth aspect of this invention there is provided a method for improving the water resistance of a consolidated wood product by treating the wood components such as, for example, fibers and flakes, prior to consolidation, with a formaldehyde-free curable aqueous composition and curing the composition.

DETAILED DESCRIPTION OF THE INVENTION

A method for strengthening a cellulosic substrate by treating the substrate with a formaldehyde-free curable aqueous composition and curing the composition is provided. The curable composition contains (a) a polyacid containing at least two carboxylic acid groups, anhydride groups, or the salts thereof; (b) optionally, an active hydrogen compound containing at least two active hydrogen groups selected from the group consisting of hydroxyl, primary amino, secondary amino, and mixtures thereof; and (c) a phosphorous-containing accelerator, wherein the ratio of the number of equivalents of said carboxylic acid groups, anhydride groups, or salts thereof to the number of equivalents of said active hydrogen groups is from about 1/0.01 to about 1/3, and wherein the carboxyl groups, anhydride groups, or salts thereof are neutralized to an extent of less than about 35% with a fixed base. The composition is applied to a substrate composed predominantly of cellulosic components. Such substrates include, for example, paper oil- and air-filter stock, rayon nonwoven wipes, polyester/cotton woven fabrics, cellulosic laminating stock, and wood fibers and flakes consolidated into or suitable to be consolidated into fiberboard, hardboard, particle board, and oriented strand board. By "strengthening a cellulosic substrate" herein is meant that at least one of the mechanical properties such as, for example, dry tensile strength and wet tensile strength of the substrate treated and cured according to the method of this invention is increased over the same property of the untreated substrate.

The formaldehyde-free curable aqueous composition of this invention is a substantially thermoplastic, or substantially uncrosslinked, composition when it is applied to the substrate, although low levels of deliberate or adventitious crosslinking may be present. On heating the binder, the binder is dried and curing is effected by heating, either sequentially or concurrently. By curing is meant herein that a chemical and/or physical change has occured, for example, covalent chemical reaction, ionic interaction or clustering, improved adhesion to the substrate, phase transformation or inversion, hydrogen bonding, and the like.

This invention is directed to a formaldehyde-free curable aqueous composition. By "formaldehyde-free composition" herein is meant that the composition is substantially free from formaldehyde, nor does it liberate substantial formaldehyde as a result of drying and/or curing. In order to minimize the formaldehyde content of the waterborne composition it is preferred, when preparing a polymer-containing formaldehyde-free curable aqueous composition, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of a substrate composed predominantly of cellulosic components. By "substantially free from formaldehyde" herein is meant that when low levels of formaldehyde are acceptable in the waterborne composition or when compelling reasons exist for using adjuncts which generate or emit low levels of formaldehyde, substantially formaldehyde-free waterborne compositions may be used.

The formaldehyde-free curable aqueous composition contains a polyacid. The polyacid must be sufficiently nonvolatile that it will substantially remain in the treated substrate during heating and curing operations. The polyacid may be a compound with a molecular weight less than about 1,000 bearing at least two carboxylic acid groups, anhydride groups, or salts thereof such as, for example, citric acid, butane tricarboxylic acid, and cyclobutane tetracarboxylic acid or it may be a polymeric polyacid with a molecular weight greater than about 1,000 such as, for example, a polyester containing at least two carboxylic acid groups and an addition polymer or oligomer containing at least two copolymerized carboxylic acid-functional monomers. The polymeric polyacid is preferably an addition polymer formed from at least one ethylenically unsaturated monomer. The addition polymer may be in the form of a solution of the addition polymer in an aqueous medium such as, for example, an alkali-soluble resin which has been solubilized in a basic aqueous medium; in the form of an aqueous dispersion such as, for example, an emulsion-polymerized dispersion; or in the form of an aqueous suspension. "Aqueous" herein includes water and mixtures composed substantially of water and water-miscible solvents.

The polymeric polyacid addition polymer must contain at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid, α,β-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomer may include acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; acrylonitrile or methacrylonitrile; and the like.

The polymeric polyacid addition polymer containing at least two carboxylic acid groups, anhydride groups, or salts thereof may have a molecular weight from about 300 to about 10,000,000. Preferred is a molecular weight from about 1,000 to about 250,000. When the polymeric polyacid addition polymer is an alkali-soluble resin having a carboxylic acid, anhydride, or salt thereof, content of from about 5% to about 30%, by weight based on the total weight of the addition polymer, a molecular weight from about 5,000 to about 100,000 is preferred, higher molecular weight alkali-soluble resins leading to curable compositions which may exhibit undesirably high application viscosity unless diluted to low application solids.

When the polymeric polyacid addition polymer is in the form of an aqueous dispersion or an aqueous suspension a glass transition temperature between about 60 C., and about −50 C. is preferred. Glass transition temperatures (Tgs) herein are those calculated as a weighted average of the homopolymer Tg values, that is, for calculating the Tg of a copolymer of monomers M1 and M2, $$Tg(calc.)=w(M1)\times Tg(M1)+w(M2)\times Tg(M2), \text{wherein}$$

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1 Tg(M2) is the glass transition temperature of the homopolymer of M2

The glass transition temperature of homopolymers may be found, for example, in "Polymer Handbook", edited by J. Brandrup and E. H. Immergut, Interscience Publishers.

And, when the polymeric polyacid addition polymer is in the form of an aqueous dispersion or an aqueous suspension and low levels of precrosslinking or gel content are desired, multi-ethylenically unsaturated monomers such as, for example, allyl methacrylate, diallyl phthalate, 1,4-butylene glycol dimethacrylate, 1,6-hexanedioldiacrylate, and the like, may be used at a level of from about 0.01% to about 5%, by weight based on the weight of the addition polymer.

When the polymeric polyacid addition polymer is in the form of an aqueous dispersion the diameter of the addition polymer particles may be from about 45 nanometers to about 1000 nanometers, as measured using a Brookhaven BI-90 Particle Sizer, which employs a light scattering technique. However, polymodal particle size distributions such as those disclosed in U.S. Pat. Nos. 4,384,056 and 4,539,361, hereby incorporated herein by reference, may be employed.

When the polymeric polyacid addition polymer is in the form of an aqueous dispersion the addition polymer particles may be made up of two or more mutually incompatible copolymers. These mutually incompatible copolymers may be present in various morphological configurations such as, for example, core/shell particles, core/shell particles with shell phases incompletely encapsulating the core, core/shell particles with a multiplicity of cores, interpenetrating network particles, and the like.

The polymeric polyacid addition polymer may be prepared by solution polymerization, emulsion polymerization, or suspension polymerization techniques for polymerizing ethylenically-unsaturated monomers which are well known in the art. When it is desired to prepare the polymeric polyacid addition polymer by emulsion polymerization, anionic or nonionic surfactants, or mixtures thereof, may be used. The polymerization may be carried out by various means such as, for example, with all of the monomer in the reaction kettle at the beginning of the polymerization reaction, with a portion of the monomer in emulsified form present in the reaction kettle at the beginning of the polymerization reaction, and with a small particle size emulsion polymer seed present in the reaction kettle at the beginning of the polymerization reaction.

The polymerization reaction to form the polymeric polyacid addition polymer may be initiated by various methods known in the art such as, for example, by the thermal decomposition of an initiator and by an oxidation-reduction reaction ("redox reaction") to generate free radicals to effect the polymerization. In another embodiment the addition polymer may be formed in the presence of phosphorous-containing chain transfer agents such as, for example, hypophosphorous acid and its salts, as is disclosed in U.S. Pat. No. 5,077,361, hereby incorporated herein by reference, so as to incorporate the phosphorous-containing accelerator and the polyacid component in the same molecule.

Chain transfer agents such as mercaptans, polymercaptans, and halogen compounds may be admixed with the polymerization mixture in order to moderate the molecular weight of the acrylic emulsion copolymer. Generally, from 0% to about 1% by weight, based on the weight of the polymeric binder, of $C_4$–$C_{20}$ alkyl mercaptans, mercaptopropionic acid, or esters of mercaptopropionic acid, may be used.

The carboxyl groups of the polyacid component of the formaldehyde-free curable aqueous composition are neutralized with fixed base to an extent of less than about 35%, calculated on an equivalents basis. Contacting the polyacid component, defined as neutralization herein, before, during, or after the formation of the curable aqueous composition, the polyacid containing two carboxylic acid groups, anhydride groups, or the salts thereof, with a fixed base is required prior to treating a cellulosic substrate. Neutralization of less than about 35% of the carboxylic acid groups, calculated on an equivalents basis, with a fixed base is required. Neutralization of less than about 20% of the carboxylic acid groups, calculated on an equivalents basis, with a fixed base is preferred. Neutralization of less than about 5% of the carboxylic acid groups, calculated on an equivalents basis, with a fixed base is more preferred. When the half ester of a dicarboxylic acid or the anhydride of a dicarboxylic acid is used, the equivalents of acid are calculated to be equal to those of the corresponding dicarboxylic acid.

"Fixed base", or "permanent base", as used herein, is defined as a monovalent base which is substantially nonvolatile under the conditions of the treatment such as, for example, sodium hydroxide, potassium hydroxide, sodium carbonate, or t-butylammonium hydroxide. Excluded from the definition of fixed base is any active hydrogen compound containing at least two active hydrogen groups selected from the group consisting of hydroxyl, primary amino, secondary amino, and mixtures thereof. The fixed base must be sufficiently nonvolatile that it will substantially remain in the composition during heating and curing operations. Volatile bases such as, for example, ammonia or volatile lower alkyl monoamines, do not function as the fixed base of this invention, but may be used in addition to the fixed base; they do not contribute to the required degree of neutralization by a fixed base. Fixed multivalent bases such as, for example, calcium carbonate may tend to destabilize an aqueous dispersion, if the addition polymer is used in the form of an aqueous dispersion, but may be used in minor amount.

The formaldehyde-free curable aqueous composition may contain an active hydrogen compound containing at least two active hydrogen groups selected from the group consisting of hydroxyl, primary amino, secondary amino, and mixtures thereof. The active hydrogen compound must be sufficiently nonvolatile that it will substantially remain available for reaction with the polyacid in the composition during heating and curing operations. The active hydrogen compound may be a compound with a molecular weight less than about 1000 bearing at least two active hydrogen groups groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, β-hydroxyalkylamides such as, for example, bis-[N,N-di(β-hydroxyethyl)]adipamide, as may be prepared according to the teachings of U.S. Pat. No. 4,076,917, hereby incorporated herein by reference, or it may be an addition polymer with a molecular weight greater than about 1000 containing at least two active hydrogen groups groups such as, for example, polyvinyl alcohol, partially hydrolyzed polyvinyl acetate, and homopolymers or copolymers of hydroxyethyl (meth)acrylate, hydroxypropyl (meth)acrylate, dimethylaminoethyl methacrylate. dimethylaminopropyl methacrylamide, and the like.

The ratio of the number of equivalents of carboxy, anhydride, or salts thereof of the polyacid to the number of equivalents of active hydrogen group in the active hydrogen compound is from about 1/0.01 to about 1/3. An excess of equivalents of carboxy, anhydride, or salts thereof of the polyacid to the equivalents of hydroxyl in the polyol is preferred. The more preferred ratio of the number of equivalents of carboxy, anhydride, or salts thereof in the polyacid to the number of equivalents of active hydrogen group in the active hydrogen compound is from about 1/0.2 to about 1/1. The most preferred ratio of the number of equivalents of carboxy, anhydride, or salts thereof in the polyacid to the number of equivalents of hydroxyl in the polyol is from about 1/0.2 to about 1/0.8.

The formaldehyde-free curable aqueous composition also contains a phosphorous-containing accelerator which may be a compound with a molecular weight less than about 1000 such as, for example, an alkali metal hypophosphite salt, an alkali metal phosphite, an alkali metal polyphosphate, an alkali metal dihydrogen phosphate, a polyphosphoric acid, hypophosphorous acid, phosphorous acid, and an alkyl phosphinic acid or it may be an oligomer or polymer bearing phosphorous-containing groups such as, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. The phosphorous-containing accelerator may be used at a level of from about 0.1% to about 40%, by weight based on the combined weight of the polyacid and the active hydrogen compound. Preferred is a level of phosphorous-containing accelerator of from about 0.2% to about 10%, by weight based on the combined weight of the polyacid solids and the active hydrogen compound.

The formaldehyde-free curable aqueous composition may contain, in addition, conventional treatment components such as, for example, emulsifiers, pigments, fillers, anti-migration aids, curing agents, coalescents, wetting agents, biocides, plasticizers, organosilanes, anti-foaming agents, colorants, waxes, and anti-oxidants.

The formaldehyde-free curable aqueous composition may be prepared by admixing the polyacid, the active hydrogen compound, and the phosphorous-containing accelerator using conventional mixing techniques. In another embodiment a carboxyl- or anhydride-containing addition polymer and an active hydrogen compound may be present in the same addition polymer. In another embodiment the salts of the carboxyl-group are salts of functional alkanolamines such as, for example, diethanolamine, triethanolamine, dipropanolamine, and di-isopropanolamine. In another embodiment the active hydrogen groups and the phosphorous-containing accelerator may be present in the same addition polymer, which addition polymer may be mixed with a polyacid. In another embodiment the carboxyl- or anhydride-groups, the active hydrogen groups, and the phosphorous-containing accelerator may be present in the same addition polymer. In some embodiments, the hydroxyl groups of cellulose may react with the polyacid. Other embodiments will be apparent to one skilled in the art.

As disclosed herein-above, the carboxyl groups of the polyacid must be neutralized to to an extent of less than about 35% with a fixed base before, during, or after forming the curable aqueous composition. Neutralization may be partially or wholly effected during the formation of the polyacid.

The formaldehyde-free curable aqueous composition may be applied to a nonwoven by conventional techniques such as, for example, air-assisted spraying, airless spraying, padding, saturating, roll coating, curtain coating, beater deposition, coagulation, or the like.

The waterborne formaldehyde-free composition, after it is applied to a nonwoven, is heated to effect drying and curing. The duration and temperature of heating will affect the rate of drying, processability and handleability, and property development of the treated substrate. Heat treatment at about 120 C. to about 400 C. for a period of time between about 3 seconds to about 15 minutes may be carried out; treatment at about 150 C. to about 200 C. is preferred. Heating may be effected in conjunction with the application of pressure. The drying and curing functions may be effected in two or more distinct steps, if desired. For example, the composition may be first heated at a temperature and for a time sufficient to substantially dry but not to substantially cure the composition and then heated for a second time at a higher temperature and/or for a longer period of time to effect curing. Such a procedure, referred to as "B-staging", may be used to provide binder-treated nonwoven, for example, in roll form, which may at a later stage be cured, with or without forming or molding into a particular configuration, concurrent with the curing process.

The treated cellulosic substrates may be used for applications such as, for example, laminates, industrial wipes, durable-press clothing, and oil and air filters, and consolidated wood products.

Nonwoven cellulosic wipes are beneficially strengthened under dry, water-wet and solvent-wet conditions which may be met in their use.

Oil-and air filter stock is beneficially strengthened to give the composite integrity at high temperatures and, in the case of oil filter applications, when saturated with hot oil. B-stageability is a beneficial p[roperty in order to provide for drying of the curable composition and subsequent fluting and curing to form a stable structure.

"Laminating stock" as used herein denotes cellulosic flat stock which may be used in pressure laminating processes or in decorative foil applications. Pressure laminating processes build up a laminate from at least two layers or plies of treated stock; the dried but substantially uncured treatment participates in bonding the files of the formed laminate. Decorative laminate foils are treated, and usually cured, cellulosic stock which may be subsequently adhered to a substrate such as, for example, particle board, to form a laminate.

PREFERABLE FEATURES

In a first aspect of this invention there is provided a method for strengthening a cellulosic substrate by treating the substrate with a formaldehyde-free curable aqueous composition and curing the composition. Preferably, the curable composition contains (a) a polyacid containing at least two carboxylic acid groups, anhydride groups, or the salts thereof; (b) optionally, an active hydrogen compound containing at least two active hydrogen groups selected from the group consisting of hydroxyl, primary amino, secondary amino, and mixtures thereof; and (c) a phosphorous-containing accelerator, wherein the ratio of the number of equivalents of said carboxylic acid groups, anhydride groups, or salts thereof to the number of equivalents of said active hydrogen groups is from about 1/0.01 to about 1/3, and wherein the carboxyl groups, anhydride groups, or salts thereof are neutralized to an extent of less than about 35% with a fixed base.

According to a second aspect of this invention there is provided a method for increasing the solvent- and water-wet strength and dry strength of a cellulosic nonwoven wipe by treating the substrate with a formaldehyde-free curable aqueous composition and curing the composition. Preferably, the curable composition contains (a) a copolymer prepared by emulsion polymerization of at least two ethylenically-unsaturated monomers and containing at least two carboxylic acid groups, anhydride groups, or the salts thereof; wherein said copolymer has a Tg between about 60 C. and about −50 C.; (b) optionally, an active hydrogen compound containing at least two active hydrogen groups selected from the group consisting of hydroxyl, primary amino, secondary amino, and mixtures thereof; and (c) a phosphorous-containing accelerator, wherein the ratio of the number of equivalents of said carboxylic acid groups, anhydride groups, or salts thereof to the number of equivalents of said active hydrogen groups is from about $1/0.01$ to about $1/3$, and wherein the carboxyl groups, anhydride groups, or salts thereof are neutralized to an extent of less than about 35% with a fixed base.

According to a third aspect of this invention there is provided a method for increasing the solvent- and water-wet strength and dry strength of paper oil- and air-filter stock by treating the substrate with a formaldehyde-free curable aqueous composition and curing the composition. Preferably, the curable composition contains (a) a polyacid formed from at least one ethylenically-unsaturated monomer bearing a carboxylic acid group, anhydride group, or a salt thereof; (b) optionally, an active hydrogen compound containing at least two active hydrogen groups selected from the group consisting of hydroxyl, primary amino, secondary amino, and mixtures thereof; and (c) a phosphorous-containing accelerator, wherein the ratio of the number of equivalents of said carboxylic acid groups, anhydride groups, or salts thereof to the number of equivalents of said active hydrogen groups is from about $1/0.01$ to about $1/3$, and wherein the carboxyl groups, anhydride groups, or salts thereof are neutralized to an extent of less than about 35% with a fixed base.

According to a fourth aspect of this invention there is provided a method for increasing the dry strength and delamination resistance of a cellulosic laminate stock by treating the substrate with a formaldehyde-free curable aqueous composition and curing the composition and a method for forming laminated, moldable composites from the paper decorative laminate stock. Preferably, the curable composition contains (a) a polyacid formed from at least one ethylenically-unsaturated monomer bearing a carboxylic acid group, anhydride group or a salt thereof and/or a copolymer prepared by emulsion polymerization of at least two ethylenically-unsaturated monomers and containing at least two carboxylic acid groups, anhydride groups, or the salts thereof; wherein said copolymer has a Tg between about 60 C. and about −50 C.; (b) optionally, an active hydrogen compound containing at least two active hydrogen groups selected from the group consisting of hydroxyl, primary amino, secondary amino, and mixtures thereof; and (c) a phosphorous-containing accelerator, wherein the ratio of the number of equivalents of said carboxylic acid groups, anhydride groups, or salts thereof to the number of equivalents of said active hydrogen groups is from about $1/0.01$ to about $1/3$, and wherein the carboxyl groups, anhydride groups, or salts thereof are neutralized to an extent of less than about 35% with a fixed base.

According to a fifth aspect of this invention there is provided a method for improving the permanent-press performance of cellulosic woven fabrics by treating the substrate with a formaldehyde-free curable aqueous composition and curing the composition. Preferably, the curable composition contains (a) a polyacid containing at least two carboxylic acid groups, anhydride groups, or the salts thereof, the polyacid further comprising a phosphinate group; (b) optionally, an active hydrogen compound containing at least two active hydrogen groups selected from the group consisting of hydroxyl, primary amino, secondary amino, and mixtures thereof; and (c) optionally, a phosphorous-containing accelerator, wherein the ratio of the number of equivalents of said carboxylic acid groups, anhydride groups, or salts thereof to the number of equivalents of said active hydrogen groups groups is from about $1/0.01$ to about $1/3$, and wherein the carboxyl groups, anhydride groups, or salts thereof are neutralized to an extent of less than about 35% with a fixed base.

According to a sixth aspect of this invention there is provided a method for improving the water resistance of a consolidated wood product by treating the wood components such as, for example, fibers and flakes prior to consolidation with a formaldehyde-free curable aqueous composition and curing the composition. Preferably, the curable composition contains (a) a polyacid containing at least two carboxylic acid groups, anhydride groups, or the salts thereof; (b) optionally, a polyol containing at least two hydroxyl groups; and (c) a phosphorous-containing accelerator, wherein the ratio of the number of equivalents of said carboxylic acid groups, anhydride groups, or salts thereof to the number of equivalents of said hydroxyl groups is from about $1/0.01$ to about $1/3$, and wherein the carboxyl groups, anhydride groups, or salts thereof are neutralized to an extent of less than about 35% with a fixed base.

The following examples are intended to illustrate the method for strengthening a cellulosic substrate of this invention. They are not intended to limit the invention as other applications of the invention will be obvious to those of ordinary skill in the art.

EXAMPLE 1

Preparation of Curable Aqueous Composition.
Preparation of Sample 1

To 81.6 grams of polyacrylic acid (M.W.=60,000; 25% solids in water) was added 5.1 grams glycerol, 3.8 grams of sodium hypophosphite monohydrate and 104.8 grams of methanol. The pH of the mixture was 2.3 and the viscosity was 10 centipoises (measured on a Brookfield LVF viscometer, #4 spindle at 100 rpm). The active ingredients were 15% (active ingredients are all components other than water and methanol).

Sample 1 is a curable aqueous composition of this invention.

EXAMPLE 2

Preparation of Comparative Sample A

To 93.8 grams of polyacrylic acid (M.W.=60,000; 25% solids in water) was added 5.9 grams glycerol, and 95.6 grams of methanol.

Comparative A contains a polyacid and glycerol, an active hydrogen compound, but no phosphorous-containing accelerator.

EXAMPLE 3

Treatment and Evaluation of Oil- and Air-Filter Paper Stock

A 20 mil thick absorbent paper stock suitable for preparing oil or air filter stock was placed in the aqueous composition of Sample 1 or Comparative A; it was then passed through a two-roll Werner Mathis AG padder to remove excess binder. The roll pressure was adjusted to give the desired add-on. The treated sheet was dried and cured in a Werner Mathis AG oven at 168 C. for a period of time as indicated in Table 3.1. The binder add-on was 28% (dry binder weight based on the weight of paper). Comparative sample B is paper stock which is untreated and unheated.

The cured sheet was then cut into 1 inch by 4 inch strips. Strips were tested for dry tensile strength by placing them in the jaws of a Thwing-Albert Intelect 500 tensile tester. Samples were pulled apart at a crosshead speed of 2 inches/ minute. Wet tensile strength was measured by soaking a second set of identically prepared cured sheet strips. The samples were soaked in 85 C. water for 10 minutes. The samples were removed from the water and tested immediately for tensile strength while still wet.

The wet tensile strength of a curable aqueous composition-treated filter paper stock which is a substantial fraction of dry tensile strength of a similarly treated filter paper stock is taken herein to indicate that a composition has cured, and that useful performance of the cured aqueous composition-treated filter paper stock results.

TABLE 3.1

Tensile Testing of Treated Filter paper stock.

| Sample | Cure Time (min.) | Dry Tensile (lb./in.) | Wet Tensile (lb./in.) |
|---|---|---|---|
| 1 | 0 | 20.8 | 3.2 |
|   | 1 | 26.5 | 11.7 |
|   | 2 | 28.4 | 12.3 |
|   | 3 | 29 | 15.9 |
|   | 5 | 28.6 | 15.5 |
| Comp. A | 0 | 23.9 | 3.4 |
|   | 1 | 23.2 | 4.1 |
|   | 2 | 2.4 | 4.8 |
|   | 3 | 20.9 | 6.5 |
|   | 5 | 17.5 | 5.0 |
| Comp. B | 0 | 13.2 | 3.2 |

Sample 1 of this invention provides levels of wet tensile strength suitable for oil- and air-filter stock when cured, while Comparative sample A does not provide useful levels of tensile strength, whether cured or not.

EXAMPLE 4

Preparation of Curable Aqueous Compositions. Preparation of Samples 2–8 and Comparative Sample C To active hydrogen compound, sodium hypophosphite monohydrate (SHP) and water mixed together was added polyacrylic acid (pAA) (M.W.=10,000; 45% solids in water). Quantities are given in Table 4.1. The degree of neutralization of the polyacid with a fixed base was <5%. The active ingredients were 10% (active ingredients are all components other than water).

TABLE 4.1

Compositions of Samples 2–8 and comparative sample C

| Sample | g. pAA | g. water | g. SHP | g. active H compound |
|---|---|---|---|---|
| 2 | 85.0 | 331.7 | 3.8 | 0 |
| 3 | 65.0 | 349.7 | 2.9 | 10.7 DEA |
| 4 | 52.0 | 356.6 | 2.3 | 17.1 DEA |

TABLE 4.1-continued

Compositions of Samples 2–8 and comparative sample C

| Sample | g. pAA | g. water | g. SHP | g. active H compound |
|---|---|---|---|---|
| 5 | 38.0 | 372.8 | 1.7 | 24.9 DEA |
| Comp C | 70.0 | 348.4 | 0 | 11.5 DEA |
| 6 | 60.0 | 349.6 | 5.7 | 9.85 DEA |
| 7 | 70.0 | 333.5 | 3.1 | 6.7 glycerol |
| 8 | 60.0 | 337.6 | 2.7 | 11.5 glycerol |

Samples 2–8 are curable aqueous compositions of this invention.

EXAMPLE 5

Preparation of Curable Aqueous Compositions at Varying Degrees of Neutralization. Preparation of Sample 9 and Comparative Sample D To diethanolamine (DEA), sodium hypophosphite monohydrate (SHP) and water mixed together was added polyacrylic acid (pAA) (M.W.=10,000; 45% solids in water) partially neutralized with sodium hydroxide, a fixed base. Quantities are given in Table 5.1.

TABLE 5.1

Compositions of Sample 9 and Comparative sample D

| Sample | g. pAA | g. water | g. SHP | g. DEA | % Neutralized |
|---|---|---|---|---|---|
| 9 | 65.0 | 349.7 | 2.9 | 10.7 | 30 |
| Comp. D | 60.0 | 322.8 | 2.7 | 9.9 | 60 |

EXAMPLE 6

Preparation of Curable Aqueous Compositions Containing Emulsion Polymerized Acid-Containing Compositions. Preparation of Samples 10–16 and comparative samples E and F For samples 10–17 and comparative sample E: To diethanolamine (DEA), sodium hypophosphite monohydrate (SHP), water, and polyacrylic acid (pAA) prepared in the presence of 2% sodium hypophosphite chain transfer agent (M.W.=10,000; 45% solids in water) mixed together was added a p(46 butyl acrylate/48 ethyl acrylate/4 itaconic acid/2 acrylic acid) emulsion polymer at 45.5 % solids content. For sample 17: To diethanolamine (DEA), sodium hypophosphite monohydrate (SHP), water, and polyacrylic acid (pAA) prepared in the presence of 2% sodium hypophosphite chain transfer agent and resulting in phosphinate terminal groups (M.W.=10,000; 45% solids in water) mixed together was added a p(46 butyl acrylate/46 ethyl acrylate/4 itaconic acid/4 acrylic acid) emulsion polymer at 45.5 % solids content. Quantities are given in Table 6.1. The degree of neutralization of the polyacid with a fixed base was <5% except for samples 16 and Comp. E, as noted in Table 6.1. The active ingredients were 10% (active ingredients are all components other than water).

TABLE 6.1

Compositions of Samples 10–17 and Comparative Sample E.

| Sample | g. emulsion pol. | g. pAA | g. water | g. SHP | g. DEA |
|---|---|---|---|---|---|
| 10 | 82.0 | 3.7 | 340.4 | 3.7 | 0 |
| 11 | 80.0 | 3.6 | 345.6 | 3.6 | 0.5 |
| 12 | 75.0 | 3.4 | 336.9 | 3.4 | 2.8 |
| 13 | 70.0 | 3.2 | 338.3 | 3.2 | 5.3 |
| 14 | 85.0 | 3.8 | 332.8 | 0 | 1.6 |
| 15 | 70.0 | 3.2 | 334.1 | 6.7 | 1.3 |
| 16[1] | 78.0 | 3.5 | 337.1 | 3.5 | 1.5 |
| Comp. E[2] | 78.0 | 3.5 | 337.1 | 3.5 | 1.5 |
| 17 | 140.0 | 6.3 | 552.2 | 0 | 3.1 |

[1] 30% of acid neutralized with sodium hydroxide, a fixed base
[2] 60% of acid neutralized with sodium hydroxide, a fixed base

EXAMPLE 7

Preparation of Curable Aqueous Compositions Containing Various Polyacids. Preparation of Samples 18–20

To diethanolamine (DEA), sodium hypophosphite monohydrate (SHP), and water mixed together was added a polyacid as indicated in Table 7.1. Quantities are given in Table 7.1. The degree of neutralization of the polyacid with a fixed base was: sample 18—ca. 30%; samples 19–20—<5%. The active ingredients were 10% (active ingredients are all components other than water).

TABLE 7.1

Compositions of Samples 18–20.

| Sample | g. polyacid | g. water | g. SHP | g. DEA |
|---|---|---|---|---|
| 18 | 65.0 p(65AA/35 MA)[1] | 349.7 | 2.9 | 10.7 |
| 19 | 65.0 p(98AA/2 SHP)[2] | 323.5 | 0 | 10.7 |
| 20 | 65.0 p(70AA/30 HEM5)[3] | 349.7 | 2.9 | 10.7 |

[1] AA = acrylic acid; MA = maleic acid
[2] AA = acrylic acid; SHP = sodium hypophosphite present during the polymerization of the acrylic acid.
[3] AA = acrylic acid; HEM5 = $CH_2CH_2C(O)(OCH_2CH_2)_nOH$; n = ca. 5

EXAMPLE 8

Treatment and Evaluation of Cellulosic Nonwovens

Substrates, either ½ oz. carded rayon (for sample 17) or Whatman Filter Paper #4, selected to simulate a cellulosic nonwoven wipe (for samples 2–16 and 18–20), were saturated on a Birch Brothers' padder. The substrate was disposed between two pieces of fiberglass scrim. The speed control was set at 5 and the pressure at 25 psi. The substrate was removed from the scrim after padding and dried and cured in a Werner Mathis AG oven at 150–165 C. as noted in Table 6.1 for 3.5 minutes. After removal from the oven, the samples were allowed to cool to room temperature and then placed in a temperature (70 F.)/humidity (50% R.H.) controlled room for 24 hours. The binder add-on was 20.3±1.5% (dry binder weight based on the weight of paper).

The cured sheet was then cut into 1 inch by 4 inch strips. Strips were tested for dry tensile strength by placing them in the jaws of a Thwing-Albert Intelect 500 tensile tester. Samples were pulled apart at a crosshead speed of 2 inches/minute. Wet tensile strength was measured by soaking a second set of identically prepared cured sheet strips. The samples were soaked in a 0.1% solution of nonionic surfactant (TRITON(R) X-100) in water for 30 minutes. The samples were removed from the water and tested immediately for tensile strength while still wet. Solvent tensile strength was measured by soaking a third set of identically prepared cured sheet strips. The samples were soaked in isopropanol (IPA) for 30 minutes. The samples were removed from the isopropanol and tested immediately for tensile strength while still wet.

The wet tensile strength of a curable aqueous composition-treated substrate which is a substantial fraction of the dry tensile strength of a similarly treated substrate and/or a solvent tensile which is comparable to the dry tensile strength of a similarly treated substrate is taken herein to indicate that a composition has cured, and that useful performance of the cured aqueous composition-treated cellulosic nonwoven results.

TABLE 8.1

Tensile(T) Testing of Treated Filter paper stock.

| Sample | Cure C./min. | Dry T (lb./in.) | Wet T (lb./in.) | IPA T (lb./in.) |
|---|---|---|---|---|
| 2 | 165/3.5 | 6369 | 1559 | 5221 |
| 3 | 165/3.5 | 5372 | 844 | 5298 |
| 4 | 165/3.5 | 3304 | 557 | 3926 |
| 5 | 165/3.5 | 1986 | <500 | 2593 |
| Comp. C | 165/3.5 | 5338 | 667 | 5570 |
| 6 | 165/3.5 | 5903 | 1100 | 5244 |
| 7 | 165/3.5 | 5246 | 2158 | 5007 |
| 8 | 165/3.5 | 4200 | 2469 | 4065 |
| 9 | 165/3.5 | 5768 | 959 | 5815 |
| Comp. D. | 165/3.5 | 5871 | 961 | 5979 |
| 10 | 150/3.5 | 5888 | 2035 | 2158 |
| 11 | 150/3.5 | 5864 | 1943 | 2534 |
| 12 | 150/3.5 | 5724 | 1939 | 2618 |
| 13 | 150/3.5 | 5234 | 1064 | 2294 |
| 14 | 150/3.5 | 5893 | 2301 | 2553 |
| 15 | 150/3.5 | 5453 | 1493 | 2535 |
| 16 | 150/3.5 | 5800 | 1180 | 2556 |
| Comp. E | 150/3.5 | 5811 | <500 | 2534 |
| 17 | 150/3.5 | 2133 | 607 | N.A. |
| 18 | 165/3.5 | 2606 | <500 | 3373 |
| 19 | 165/3.5 | 6186 | 1397 | 6122 |
| 20 | 165/3.5 | 3390 | 806 | 3413 |

Samples 2–9 relate to curable compositions of this invention which contains a polyacid. Samples 2–5 of this invention exhibit useful levels of wet and solvent tensile strengths for cellulosic nonwoven wipes as a function of diethanolamine level. Samples 3 and 6 of this invention compared to comparative sample C exhibit useful levels of wet tensile strength for cellulosic nonwoven wipes as a function of phosphorous-containing accelerator (SHP). Samples 7–8 of this invention exhibit useful levels of wet and solvent tensile strengths for cellulosic nonwoven wipes at two glycerol levels. Samples 3 and 9 of this invention exhibit useful levels of wet and solvent tensile strengths for cellulosic nonwoven wipes as a function of degree of neutralization of carboxyl groups.

Samples 10–17 relate to curable compositions of this invention which contain an emulsion-polymerized acid-containing copolymer. Samples 10–13 of this invention exhibit useful levels of wet and solvent tensile strengths for cellulosic nonwoven wipes as a function of diethanolamine level. Samples 11 and 14–15 of this invention exhibit useful levels of wet tensile and solvent tensile strength for cellulosic nonwoven wipes at various levels of phosphorous-containing accelerator (SHP); Samples 11 and 16 of this invention exhibit superior wet tensile strength relative to

15

Comparative sample E as a function of degree of neutralization of carboxyl groups with a fixed base.

Sample 17 of this invention used as a binder for a rayon nonwoven exhibits a useful level of dry and wet tensile strength for a cellulosic nonwoven wipe.

Samples 18–20 relate to curable compositions of this invention which contain various polyacids and all exhibit useful levels of solvent tensile strength for cellulosic nonwoven wipes.

EXAMPLE 9

Preparation of Curable Aqueous Compositions for Decorative Laminate Foil Applications Preparation of samples 21–22 and comparative sample F. To a poly(acrylic acid/ethyl acrylate) copolymer (65 AA/35 EA) (M.W.=20,000; 31.9 % solids in water) was added triethanolamine (TEA) or sodium hypophosphite monohydrate (SHP); and water mixed together. Quantities are given in Table 9.1. The degree of neutralization was approximated from the measured pH and is given in Table 9.1. The active ingredients were: sample 21–36.4%; sample 22–34.3%; comparative sample F-31.9% (active ingredients are all components other than water).

Preparation of sample 23. To triethanolamine (TEA), sodium hypophosphite monohydrate (SHP) and water mixed together was added poly(acrylic acid) (M.W.=10,000; 45% solids in water). Quantities are given in Table 9.1. The active ingredients were 38% (active ingredients are all components other than water).

Preparation of sample 24. To triethanolamine (TEA) and water mixed together was added a poly(acrylic acid/maleic acid) copolymer (pAA/MA; 55/28) prepared in the presence of 17% sodium hypophosphite chain transfer agent and resulting in phosphinate groups incorporated in the polymer (M.W.=1500; 55% solids in water) Quantities are given in Table 9.1. The active ingredients were 38% (active ingredients are all components other than water).

Preparation of sample 25. To 168.6 g. of a poly(acrylic acid/maleic acid) copolymer (pAA/MA; 74/20) prepared in the presence of 6% sodium hypophosphite chain transfer agent (58.5% solids) was added 511.8 g. of an emulsion polymer of p(64 ethyl acrylate/32 methyl methacrylate/4 acrylamide) (45% solids), 172.0 g. water, and 13.5 g. 5N. sodium hydroxide. The polyacid was 15% neutralized with a fixed base. The active ingredients were 38.2% (active ingredients are all components other than water).

Preparation of comparative sample G. To form comparative sample G from a separate preparation of sample 24 were additionally added 35.7 g. solid sodium hydroxide and 30.0 g. 5N sodium hydroxide. The active ingredients were 43.4% (active ingredients are all components other than water).

TABLE 9.1

Compositions of Samples 21–24 and comparative samples F–G

| Sample | g. polyacid | g. water | g. SHP | g. TEA | % Neut. |
|---|---|---|---|---|---|
| Comp. F | 500 | 0 | 0 | 0 | <5 |
| 21 | 500 | 0 | 48.0 | 0 | 5 |
| 22 | 500 | 0 | 0 | 17.9 | 20 |
| 23 | 865.4 | 387.9 | 24.4 | 122.4 | 30 |
| 24 | 391.3 | 284.1 | 0 | 66.7 | 25 |
| Comp. G | 391.3 | 218.4 | 0 | 66.7 | 50 |

EXAMPLE 10

Treatment and Evaluation of Laminating Stock

Impregnated, cured papers useful as decorative laminate foils were prepared by saturating medium weight papers (A=75 grams/square meter; B=82 grams/square meter) with the curable aqueous compositions, samples 21–24 and comparative samples F–G. The sheets were placed in the aqueous composition bath for 30 seconds and passed through a nip at 12 psi. The saturated papers were then cured at 180 C. for 2 minutes in a Werner-Mathis oven using full air flow. Add-on was determined by weighing the samples before saturation and after saturation and calculating the solids added as a percentage of the initial paper weight and are presented in Tables 10.1 and 10.2 as weight % of the active ingredients deposited based on weight of paper stock.

Delamination Resistance. The cohesive strength of a single ply of treated paper was measured by contacting a 1 inch by 1 inch surface of the paper with Scotch Magic Tape(TM) for 5 seconds (reported herein as Delam0) or for 18 hours (reported herein as Delam18) at 72 F and 50% R.H. After the contact period the tape was rapidly pulled by hand from the paper in the opposite direction from which the tape was applied. The percentage of the area within the 1 square inch test area which showed no evidence of fiber removal was reported Flexibility. Flexibility of the treated paper was determined by conditioning 1.5 cm. by 4.0 cm. specimens at 50% R.H. and 72 F. for 24 hours and rapidly bending the specimens over a mandrel. The average mandrel diameter which did not cause cracking of the specimen was reported herein as Flex 50RH. Flexibility at low relative humidity was determined by drying 1.5 cm. by 4.0 cm. specimens for 5 minutes at 85 C. in a forced air oven, followed by bending over mandrels, reported herein as Flex LoRH.

Water Absorption (Cobb Test). A modification of TAPPI Test Method T 441om-84 was used. The procedure was modified to use 25 ml. of water, reducing the head to 0.25 cm. The test period was 60 seconds. One ply of paper was tested at a time. The Absorptiveness was calculated as the weight of water absorbed in grams per square meter and reported herein as Cobb.

Cutability. The ability of a treated laminate foil to yield a good clean cut under use conditions was simulated by breaking a treated, cured sheet of stock by hand. A clean break was rated good (G) and a break resulting in protruding fibers was rated poor (P).

TABLE 10.1

Results of evaluation of saturated laminating stock A

| Saturant | Add-on | Delam 0 | Delam 18 | Flex 50RH | Flex LoRH | Cobb | Cut. |
|---|---|---|---|---|---|---|---|
| Comp. F | 42.3 | 52 | 15 | 13.5 | 19.1 | 50.4 | G |
| 21 | 51.5 | 100 | 99 | 2.0 | 15.6 | 32.8 | G |
| 22 | 46.2 | 100 | 100 | 1.3 | 7.9 | 46.8 | G |
| 23 | 51.3 | 100 | 99 | 1.8 | 11.1 | 68.7 | G |
| 24 | 40.3 | 97 | 95 | 2.5 | 9.5 | 74.9 | G |
| 25 | 43.9 | 100 | 100 | 0.5 | 1.8 | 8.1 | G |
| Comp. G | 39.7 | 95 | 55 | 0.5 | 4.8 | 53.5 | P |

TABLE 10.2

Results of evaluation of saturated laminating stock B

| Saturant | Add-on | Delam 0 | Delam 18 | Flex 50RH | Flex LoRH | Cobb | Cut. |
|---|---|---|---|---|---|---|---|
| Comp. F | 29.8 | 99 | 73 | 4.8 | 14.3 | 57.9 | G |
| 21 | 35.6 | 100 | 99 | 2.3 | 7.9 | 44.9 | G |
| 22 | 32.3 | 100 | 100 | 1.3 | 4.8 | 71.0 | G |
| 23 | 36.5 | 99 | 100 | 2.0 | 7.2 | 55.9 | G |
| 24 | 33.2 | 100 | 90 | 3.1 | 3.2 | 64.0 | G |
| 25 | 32.7 | 100 | 90 | 0.5 | 2.0 | 21.5 | G |
| Comp. G | 31.4 | 100 | 40 | 0.5 | 9.5 | 51.7 | P |

Samples 21–23 of this invention exhibit superior delamination resistance and increased flexibility, and comparable Cobb Water absorption values and cutability relative to comparative sample F. Sample 25 exhibited superior delamination resistance, increased flexibility, and superior Cobb Water absorption values and cutability relative to comparative sample F. Sample 24 of this invention exhibits superior delamination resistance, lessened dependence of flexibility on humidity, and superior cutability relative to comparative sample G.

EXAMPLE 11

Preparation and Evaluation of Multiple Ply Laminates

Preparation of sample 26. To 71.8 g. triethanolamine (TEA) and 169.1 g. water mixed together was added a poly(acrylic acid/maleic acid) copolymer (pAA/MA; 74/20) prepared in the presence of 6% sodium hypophosphite chain transfer agent and resulting in phosphinate groups (M.W.= 3700; 58.5% solids in water). The degree of neutralization of the polyacid with a fixed base was estimated at 25%, based on the pH of the sample.

A 150 grams/square meter sheet was saturated for 40 seconds in a 47% weight solids bath of sample 24, sample 26, or comparative sample G; the wet saturated sheet was passed through a light nip at 2 psi. The sheets were dried at 85 C. for 2 minutes to remove excess moisture. Four plies of the dried impregnated paper were later laminated together by placing them between platens heated to 180 C. for 15 minutes under a pressure of 167 psi. The bonding of the plies of the laminate was evaluated by attempting to pry them apart with a knife edge; results were reported as delamination resistance.

Gurley stiffness. Gurley stiffness measures the force required to bend paper under specific conditions. Blotter stock was prepared with 60% dry add-onof samples 24, 26, and comparative sample G; the stock was pressed between platens heated to 180 C. for 15 minutes under a pressure of 15 psi. The pressed blotter stock was equilibrated at 72 F. and 50% R.H. and cut into strips for testing. The test was conducted according to TAPPI Test Method T 543 pm-84 using 0.5 inch wide strips and actual lengths of 1.5 and 2.5 inches. Gurley stiffness was calculated as mg. of force and is presented in Table 11.1.

TABLE 11.1.

Evaluation of Multiple Ply Laminates

| Sample | Gurley Stiffness (mg.) | Delamination Resistance |
|---|---|---|
| 24 | 25,100 | very good |
| 26 | 37,300 | very good |
| Comp. G | 6,000 | fair–good |

Samples 24 and 26 of this invention are suitable for use as impregnants for cellulosic stock for laminating applications.

EXAMPLE 12

Preparation and Evaluation of Moldable B-Stageable Cellulosic Felts

Blotter paper was saturated with sample 23 by immersing the blotter paper in a 47 weight % solids bath for several minutes. The wet saturated sheet was passed through two rolls at 2 psi. to squeeze out excess saturant, and the sheet was dried at 85 C. for 2 minutes to reduce moisture content and to allow handling of the sheet. Dry pick-up was 43 weight %. Several days later a portion of the sheet was pressed in a stepped mold at 100 pounds pressure and 180 C. for 15 minutes to form and cure the steps. The molded steps were flexed and distorted but returned to their formed shape, whereas molded but untreated blotter stock could be readily permanently distorted on flexing.

A sheet of the impregnated, uncured blotter prepared as above was cut into 1.25 inch wide strips which were pressed at 100 psi. and 180 C. for 15 minutes. After equilibration of the cured strips at 60% relative humidity they were transversely bent between two bars 5.5 cm. apart under a 1 kg. load for 30 minutes at 130 F. The strips had no permanent deformation.

Two plies of the dried impregnated, uncured blotter paper were pressed together at 1000 psi. and 180 C. for 15 minutes to form a laminate. The laminate was rigid in appearance and had very strong bonding between the plies. The laminate displayed no adverse effects after immersion for 10 minutes in 72 F. water.

Similarly, thick nonwoven cellulose felts were impregnated with 38 weight % sample 23 and were dried for 12 minutes at 85 C. to remove excess moisture. The dried uncured felts were molded into rigid "hats" having sharp angles at 100 pounds pressure and 180 C. for 15 minutes to form and cure the hats. The molded,cured hats had good resistance to 54 C. heat and 6.1 kg. of weight applied simultaneously for one hour. Very little permanent deformation occurred.

Sample 23 is useful as a B-stageable impregnant suitable for molding and laminating cellulosic stock into high strength structures.

EXAMPLE 13

Evaluation of Durable Press Performance of Cotton Fabric Treated with Curable Aqueous Composition A desized, scoured, and bleached 100% cotton print cloth (Style 400 from Test Fabrics, Inc., Middlesex, N.J.) was used. The material was 45 inches wide and weighed 3.1 ounces per square yard. Finishing solutions samples 27–30 and comparative sample H were prepared the day before they were used in padding the samples. A 1000 g. finishing solution was prepared at 7.5 weight percent solids of the treatment polyacid, optional active hydrogen compound, and phosphorous-containing accelerator components in deionized water. Other additives were added as disclosed but in addition to the 7.5 weight percent value. The pH was adjusted to 3.0 with NaOH or HCl as required.

The fabric was cut into 16 inch (warp) by 13 inch (filling) sheets and conditioned in the laboratory prior to padding. Three sheets of finished cloth were prepared for each sample. The sheets were weighed and then padded using a double dip-nip sequence on a Werner-Mathis padder. The roll pressure was set at 6.0 bars, and roll speed was 6.0 meters per second. The samples were weighed immediately and wet pick-up was calculated. These conditions provided a wet pick-up of approximately 67% on weight of fabric and a calculated dry add-on of approximately 4.5% on weight of fabric. The wet sheets were suspended and pinned under light tension in the warp direction on a frame. The samples were dried/cured for 3.5 minutes at 180 C. in one operation using a Werner-Mathis oven. The oven was set for full air flow and equal top to bottom air impingement on the sample. All samples were conditioned in the specified environment prior to testing.

Sample 27 was a p(55% acrylic acid/28% maleic acid) copolymer prepared in the presence of 17 weight % sodium hypophosphite (M.W.=2000). The degree of neutralization of the polyacid with a fixed base was 20%.

Sample 28 was a p(39.3% acrylic acid/25.7% maleic acid) copolymer prepared in the presence of 35 weight % sodium hypophosphite (M.W.=960). The degree of neutralization of the polyacid with a fixed base was 20%.

Comparative sample H was a p(20% acrylic acid/80% maleic acid) copolymer (M.W.=2210). The degree of neutralization of the polyacid with a fixed base was 20%.

Sample 29 was sample 28 with added 25 weight % sodium hypophosphite on weight of polymer solids. Total solids of the sample was 7.5%. The degree of neutralization of the polyacid with a fixed base was 20%.

Sample 30 was 1,2,3,4-butanetetracarboxylic acid to which was added 85.65 weight % sodium hypophosphite on weight of the polyacid. The degree of neutralization of the polyacid with a fixed base was 10%.

Sample 31 was formed from 111.5 g. polymer p(70.6% maleic acid) prepared in the presence of 29.4 weight % sodium hypophosphite (M.W.=470) (67.3% solids) and 888.5 g. water. The degree of neutralization of the polyacid with a fixed base was 20%.

Sample 32 was formed from 111.5 g. polymer p(70.6% maleic acid) prepared in the presence of 29.4 weight % sodium hypophosphite (M.W.=470) (67.3% solids), 6.1 g. triethanolamine, and 882.4 g. water. The degree of neutralization of the polyacid with a fixed base was 10%.

Comparative sample I was untreated cloth.

Wrinkle Recovery was determined using AATCC Test method 66-1990. The test measures the recovery, in degrees, of a creased and compressed specimen which is suspended in the test instrument for a controlled recovery period. Three test specimens (15 mm. by 40 mm.) were cut in the warp and filling directions from each of two replicate sheets. The specimens were conditioned overnight at 65% R.H. and 70 F. prior to testing. The average recovery angle was calculated for each direction. The combine recovery angle was calculated by adding the average warp and filling angles and is reported herein as wrinkle recovery.

Handle was measured using a Thwing-Albert Handle-O-Meter, Model 211-5. Three 4 inch by 4 inch specimens were cut from each of two replicate sheets and were conditioned at 65% R.H. and 70F. prior to testing. The H-O-M slot width was set at 5 mm. Measurements were taken in each of four positions per specimen as required by the instrument manufacturer's test manual, and the four measurements were summed to give the handle for a single specimen. The average handle for the 6 specimens was calculated and reported herein as Handle-O-Meter.

Tensile strength was determined according to ASTM Test Method D1682-64. Tear strength was determined according to ASTM Test Method D1424-83. % Retained values reported herein refer to the % of the untreated, uncured value retained after treatment and curing.

Yellowness was determined using a Hunter ColorQuest instrument. The instrument was calibrated and operated in the reflectance mode with the specular light excluded. Illuminant C was used. The observer angle was 10 degrees. The color of undyed, finished cotton print cloth was measured on six 4 inch by 4 inch specimens which were folded over twice (4 thicknesses of cloth per specimen) to provide 24 total thicknesses of backing when making each measurement. The average b* value was recorded for the test and untreated control samples. Delta b*, expressed as the difference of the control value minus the test sample value for the b* parameter, was calculated for each test sample. Higher values of Delta b* indicate yellower samples.

TABLE 13.1

Evaluation of finished cotton fabric

| Sample | Wrinkle Recovery | Handle-O-Meter | % Tensile Retention | % Tear Retention | Yellowness Delta b* |
|---|---|---|---|---|---|
| 27 | 224 | 66 | 72 | 74 | .12 |
| 28 | 217 | 59 | 78 | 78 | .25 |
| Comp. H | 209 | 64 | 63 | 64 | .94 |
| 29 | 211 | 65 | 73 | 74 | 1.27 |
| 30 | 251 | 57 | 60 | 64 | 1.14 |
| Comp. I | 177 | 58 | 100 | 100 | 0 |
| 31 | 211 | 67 | 73 | na | .72 |
| 32 | 216 | 70 | 70 | na | .97 |

Samples 27–32 of this invention exhibit superior wrinkle recovery relative to untreated fabric, comparative sample 1. Addition polymer polyacids, samples 27–29, 31, and 32 of this invention, exhibit superior tear and tensile retention compared with low molecular weight non-polymeric polyacids as exhibited by sample 30. Sample 29 of this invention incorporating phosphorous-containing accelerator exhibits superior tensile and tear retention relative to the same composition without phosphorous-containing accelerator (Comparative H). Samples 27 and 28 of this invention wherein the polyacid component incorporates the phosphorous-containing accelerator exhibit superior (lower) yellowing while maintaining a useful level of other treated, cured fabric properties.

EXAMPLE 14

Evaluation of Consolidated Wood Product Treated with Curable Aqueous Composition Comparative sample J was polyacrylic acid (M.W.=10,000). The degree of neutralization of the acid with a fixed base was approximately 25% (pH=4).

Sample 33 was 100 g. by dry weight polyacrylic acid (M.W.=10,000) to which 10 g. triethanolamine and 5 g. sodium hyposphosphite was added. The degree of neutralization of the acid with a fixed base was approximately 25% (pH=4).

A 20% solids sample of sample 33 or comparative sample J was sprayed into wood chips tumbling in an open-ended drum. The wood chips varied in size but a chip of ¼ inch by 1/16 inch by 1/64 inch was typical. After 5 minutes of tumbling the chips were placed in a 6 inch by 6 inch forming box and compressed at 100 psi at ambient temperature for 1 minute to form a mat. The mat was then pressed to form a consolidated wood product, a flakeboard, under conditions of 350 F. and 278 psi. for 3 minutes resulting in a board density of 0.7 grams/cc. The board was then cut into 2 inch by 2 inch test specimens and immersed in boiling water for 30 minutes. The board was removed and its thickness measured with calipers. The % swell as reported herein was calculated relative to the treated, cured pressed board which had not been subjected to the boiling water; a rating of "fail" indicated that the board disintegrated at least in part. The modulus of rupture (MOR) of the board in psi. was also determined. Results are presented in Table 14.1.

TABLE 14.1

Evaluation of consolidated flake boards

| Sample | % Swell | MOR (psi.) |
| --- | --- | --- |
| Comp. J | Fail | 938 |
| 33 | 70 | 935 |

Sample 33 of this invention was an effective binder for a consolidated wood product.

What is claimed is:

1. A method for strengthening a cellulosic substrate comprising contacting said substrate with a formaldehyde-free curable aqueous composition comprising (a) a polyacid containing at least two carboxylic acid groups, anhydride groups, or the salts thereof; (b) a phosphorous-containing accelerator, and (c) at least one active hydrogen compound, said active hydrogen compound comprising at least two active hydrogen groups selected from the group consisting of hydroxyl, primary amino, secondary amino, and mixtures thereof; wherein said carboxyl groups, anhydride groups, or salts thereof are neutralized to an extent of less than about 35% with a fixed base; and wherein the ratio of the number of equivalents of said carboxylic acid groups, anhydride groups, or salts thereof to the number of equivalents of said active hydrogen groups is from about 1/0.01 to about 1/3; and heating said composition.

2. The method of claim 1 wherein said polyacid is an addition polymer formed from at least one ethylenically-unsaturated monomer.

3. A method for increasing the solvent- and water-wet strength and dry strength of a cellulosic nonwoven wipe comprising contacting said nonwoven with a formaldehyde-free curable aqueous composition comprising (a) a polyacid containing at least two carboxylic acid groups, anhydride groups, or the salts thereof; (b) a phosphorous-containing accelerator, and (c) at least one active hydrogen compound, said active hydrogen compound comprising at least two active hydrogen groups selected from the group consisting of hydroxyl, primary amino, secondary amino, and mixtures thereof; wherein said carboxyl groups, anhydride groups, or salts thereof are neutralized to an extent of less than about 35% with a fixed base; and wherein the ratio of the number of equivalents of said carboxylic acid groups, anhydride groups, or salts thereof to the number of equivalents of said active hydrogen groups is from about 1/0.01 to about 1/3; and heating said composition.

4. The method of claim 3 wherein said polyacid is an addition polymer formed from at least one ethylenically-unsaturated monomer.

5. The method of claim 3 wherein said polyacid comprises a copolymer prepared by emulsion polymerization of at least two ethylenically-unsaturated monomers and contains at least two carboxylic acid groups, anhydride groups, or the salts thereof; wherein said copolymer has a Tg between about 60 C. and about –50 C.

6. A method for increasing the solvent- and water-wet strength and dry strength of paper oil- and air-filter stock comprising contacting said stock with a formaldehyde-free curable aqueous composition comprising (a) a polyacid containing at least two carboxylic acid groups, anhydride groups, or the salts thereof; and (b) a phosphorous-containing accelerator, and (c) at least one active hydrogen compound, said active hydrogen compound comprising at least two active hydrogen groups selected from the group consisting of hydroxyl, primary amino, secondary amino, and mixtures thereof; wherein said carboxyl groups, anhydride groups, or salts thereof are neutralized to an extent of less than about 35% with a fixed base; and wherein the ratio of the number of equivalents of said carboxylic acid groups, anhydride groups, or salts thereof to the number of equivalents of said active hydrogen groups is from about 1/0.01 to about 1/3; and heating said composition.

7. The method of claim 6 wherein said polyacid is an addition polymer formed from at least one ethylenically-unsaturated monomer.

8. The method of claim 6 wherein said polyacid comprises a copolymer prepared by emulsion polymerization of at least two ethylenically-unsaturated monomers and contains at least two carboxylic acid groups, anhydride groups, or the salts thereof; wherein said copolymer has a Tg between about 60 C. and about –50 C.

* * * * *